Patented June 9, 1925.

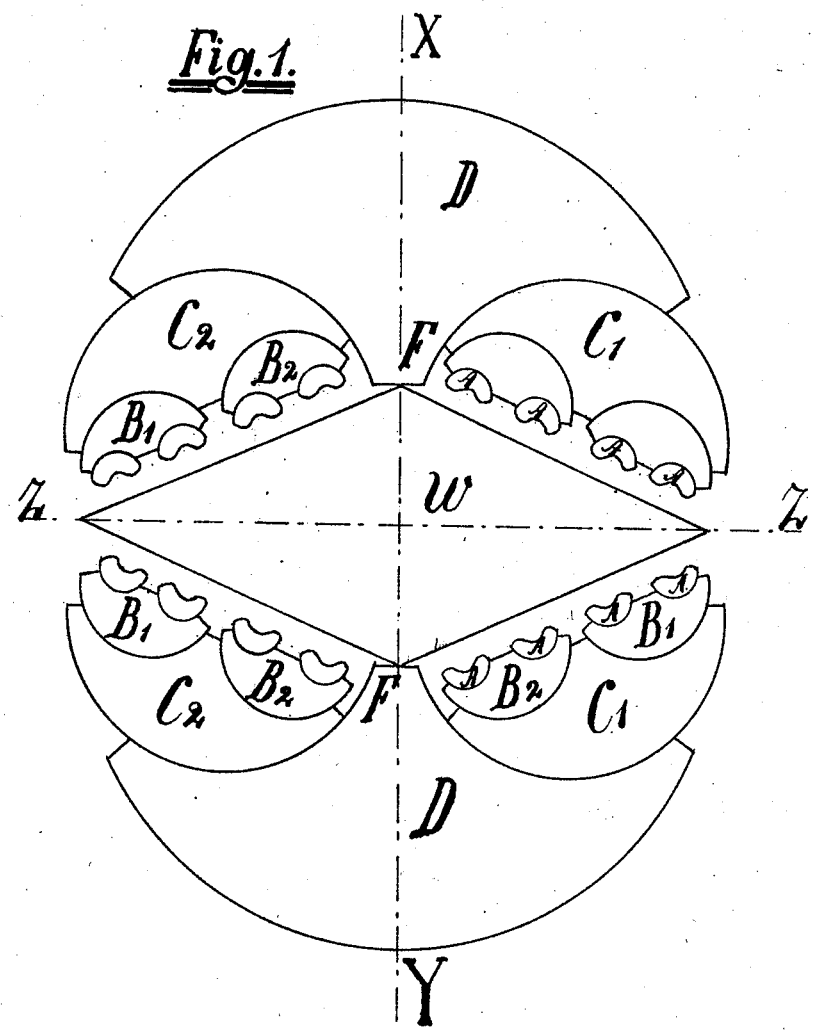

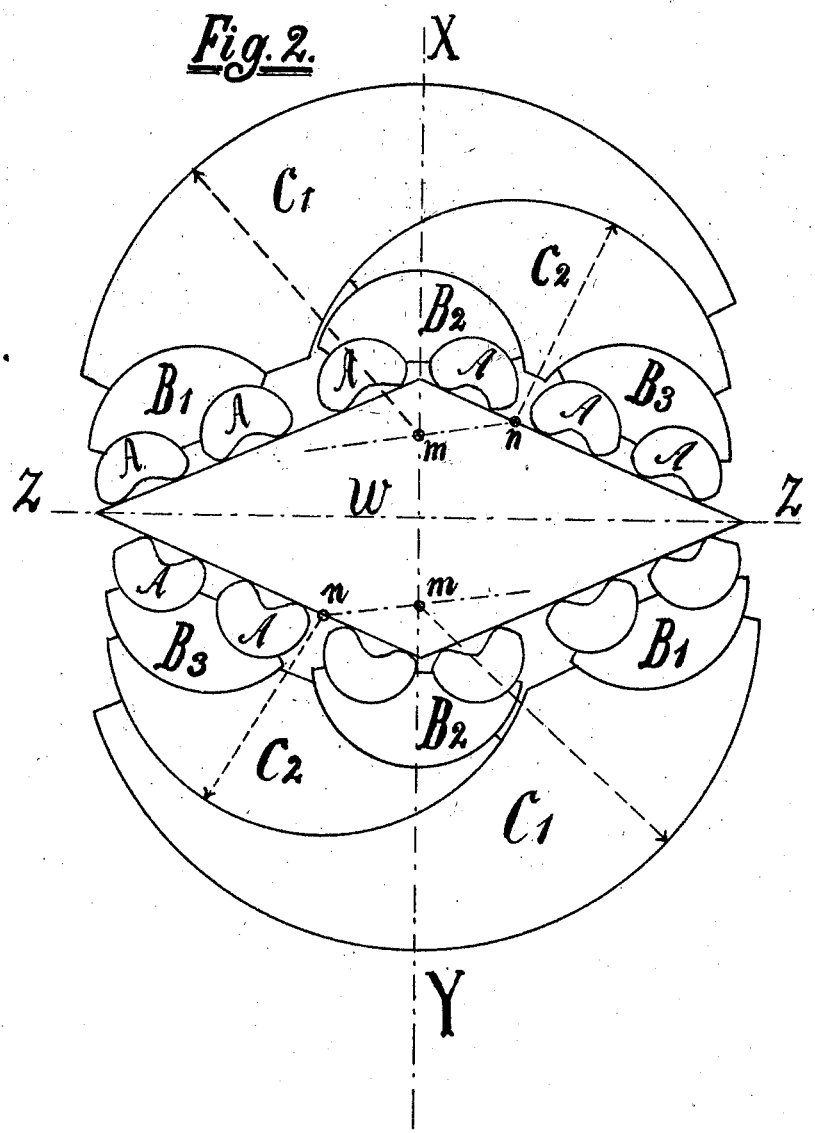

1,540,832

UNITED STATES PATENT OFFICE.

PAUL FÖRSTER, OF NUREMBERG, GERMANY, ASSIGNOR TO AKTIENGESELLSCHAFT VORM. ADOLF FINZE & CO., OF NUREMBERG, GERMANY.

CHUCK JAW.

Application filed February 13, 1922. Serial No. 536,376.

*To all whom it may concern:*

Be it known that I, PAUL FÖRSTER, a citizen of the German Republic, residing at Nuremberg, Germany, have invented certain new and useful Improvements in Chuck Jaws, of which the following is a specification.

In chuck jaws of known construction, illustrated in Figure 1, consisting of several parts pivotally connected the one with the others and in which the jaws are mounted after the manner of a weighing scale, the jaws A which are designed to hold the work piece, as well as the jaws B' and B², which serve to guide the clamping jaws, are arranged symmetrically with regard to the axis of the spindle X Y. The take-up jaws B' and B² can be guided in a number of take-up jaws of larger size, for instance C' and C² which themselves are guided in larger jaws D and so forth so that several sets of identical jaws are produced. All the take-up jaws of one set, viz, all the jaws A, B or C are of the same diameter and arranged symmetrically the central axis of the vice.

On the drawings:—

Fig. 1 shows in plan view the arrangement of known construction designed to be improved.

Fig. 2 shows in plan view the arrangement improved according to this invention.

In the arrangement of the known type, shown on Fig. 1, the inconvenience makes itself felt, in that an unelastic surface F of one of the larger take-up jaws, for instance of the jaws D in the central axis X Y, cannot be avoided. If the work piece W to be clamped were shaped as shown in Fig. 1 and so long as its edges would get into the range of this surface F, it would be locked by this rigid surface F before the clamping jaws proper A, which serve for the clamping, could come in contact with the work piece W at these points, as illustrated in Figure 1. The range of clamping was thus limited in an undesirable manner as regards the advantages resulting from the complete embracing of the work piece by the jaws A. This inconvenience can be avoided if, according to the invention, the arrangement is improved as shown on Fig. 2.

A are the clamping jaws (first set) which are designed to come in contact with the work piece W. They are pivotally mounted in larger take-up jaws B' B² and B³ (second set of jaws) which themselves can be guided, if required, in a third set of take-up jaws C' and C² of still larger size, and so forth. The novelty consists in having the jaws, for instance, of the set C' and C² designed to guide the sets B', B², B³ of various diameters and eccentrically inserted into one another and having the centers $m$, $n$ of their circular guide tracks situated on a straight line inclined with regard to the axis Z—Z of the chuck. The axis Z—Z stands perpendicular to the spindle X Y. In this manner the jaws of the same set are of different diameters as can be seen from the jaws C' and C² of the third set of jaws on Fig. 2, which shows that in the manner described it has become possible to bring all the jaws A in contact with the work piece W, which is not the case in the form of construction shown on Fig. 1.

I claim:—

A chuck jaw comprising in combination different sets of oscillatingly mounted jaws, the first inner set consisting of jaws of equal diameter being adapted to engage and hold the work piece, the jaws of one of the two other inner sets of jaws being of different diameters and seated one within the other, the inner one being of a diameter less than the diameter but greater than the radius, of the outer one in which it is seated and guided.

In testimony whereof I affix my signature in presence of two witnesses.

PAUL FÖRSTER.

Witnesses:
 ALEXANDER DE SOTO,
 ALEXIS V. GHILIPPOFF.